United States Patent
Collins et al.

(10) Patent No.: US 6,392,544 B1
(45) Date of Patent: May 21, 2002

(54) METHOD AND APPARATUS FOR SELECTIVELY ACTIVATING RADIO FREQUENCY IDENTIFICATION TAGS THAT ARE IN CLOSE PROXIMITY

(75) Inventors: Timothy James Collins, Lockport; Patrick L. Rakers, Kildeer; Richard Stanley Rachwalski, Lemont, all of IL (US); James G. Quaderer, Sunnyvale, CA (US)

(73) Assignee: Motorola, Inc., Schaumberg, IL (US)

( * ) Notice: Subject to any disclaimer, the term of this patent is extended or adjusted under 35 U.S.C. 154(b) by 0 days.

(21) Appl. No.: 09/669,289

(22) Filed: Sep. 25, 2000

(51) Int. Cl.$^7$ ............................................... G08B 13/14
(52) U.S. Cl. ............................... 340/572.7; 340/568.1; 340/825.54; 340/571; 340/539; 340/572.1; 340/10.1; 340/10.2; 340/10.31; 340/10.32; 340/2.2; 340/5.91
(58) Field of Search ........................... 340/572.7, 568.1, 340/825.54, 571, 539, 572.1, 10.2, 10.1, 10.32, 10.31, 2.2, 5.91

(56) References Cited

U.S. PATENT DOCUMENTS

| | | | |
|---|---|---|---|
| 5,175,418 A | 12/1992 | Tanaka .......................... 235/439 |
| 5,298,770 A | * 3/1994 | Im ................................ 257/139 |
| 5,382,952 A | * 1/1995 | Miller .................... 340/825.54 |
| 5,448,110 A | * 9/1995 | Tuttle et al. ................. 257/723 |
| 5,519,381 A | * 5/1996 | Marsh et al. ................. 340/572 |
| 5,528,222 A | 6/1996 | Moskowitz et al. ......... 340/572 |
| 5,537,126 A | * 7/1996 | Kayser et al. ................... 345/1 |
| 5,566,441 A | 10/1996 | Marsh et al. ................... 29/600 |
| 5,682,143 A | 10/1997 | Brady et al. ................. 340/572 |
| 5,786,626 A | 7/1998 | Brady et al. ................. 257/673 |
| 5,847,447 A | 12/1998 | Rozin et al. ................. 257/678 |
| 5,850,187 A | 12/1998 | Carrender et al. ...... 340/825.54 |
| 5,854,480 A | 12/1998 | Noto ............................ 235/492 |
| 5,936,527 A | * 8/1999 | Isaacman et al. ......... 340/572.1 |
| 6,001,211 A | 12/1999 | Hiroyuki ..................... 156/277 |
| 6,122,492 A | * 9/2000 | Sears ........................... 455/127 |

* cited by examiner

*Primary Examiner*—Daniel J. Wu
*Assistant Examiner*—Tai T. Nguyen
(74) *Attorney, Agent, or Firm*—Terri S. Hughes

(57) ABSTRACT

A radio frequency identification exciter (200) includes a plurality of antenna elements (122*a–i*) that are spaced to define active areas (130*a–e*). A matrix switch (202) flexibly connects the plurality of antenna elements to an exciter circuit (203). Independent switches (204*a–i*) are selectively switched such that an electric field is generated between at least two antenna elements whereby radio frequency identification tags (132) in the vicinity of the two antenna elements are capacitively powered to exchange data with the exciter. Antenna elements other than the at least two antenna elements may be selectively coupled to a signal from the exciter circuit that inhibits activation of radio frequency identification tags in the vicinity of those antenna elements. The matrix switch preferably comprises polymer-based circuits.

27 Claims, 4 Drawing Sheets

METHOD AND APPARATUS FOR SELECTIVELY ACTIVATING RADIO FREQUENCY IDENTIFICATION TAGS THAT ARE IN CLOSE PROXIMITY

FIELD OF THE INVENTION

The invention generally relates to radio frequency identification tags, and in particular, to a method and apparatus for selectively accessing certain radio frequency identification devices that are in close proximity to other radio frequency identification devices.

BACKGROUND OF THE INVENTION

Remotely powered electronic devices and related systems are known. For example, U.S. Pat. No. 5,099,227 issued to Geiszler et al. titled "Proximity Detecting Apparatus", discloses a remotely powered device which uses electromagnetic coupling to derive power from a remote source and then uses both electromagnetic and electrostatic coupling to transmit stored data to a receiver often collocated with the remote source. Such remotely powered communication devices are commonly known as radio frequency identification ("RFID") devices.

It is understood that the term electromagnetic refers to systems that primarily send and receive magnetic fields and are primarily inductively coupled. It is understood that the term electrostatic refers to systems that primarily send and receive electric fields and are primarily capacitively coupled.

RFID devices and associated systems have numerous uses. For example, RFID devices are frequently used for personal identification in automated gate sentry applications protecting secured buildings or areas. These devices often take the form of access control cards. Information stored on the RFID device identifies the person seeking access to the secured building or area. Older automated gate sentry applications require the person accessing the building to insert or swipe their identification tag or card into or through a exciter for the system to read the information from the identification tag. Newer RFID device systems allow the RFID device to be read at a small distance using radio frequency data transmission technology, thereby eliminating the need to insert or swipe an identification tag into or through an exciter. Most typically, the user simply holds or places the RFID device near a base station, which is coupled to a security system securing the building or area. The base station transmits an excitation signal to the RFID device that powers circuitry contained on the RFID device. The circuitry, in response to the excitation signal, communicates stored information from the radio frequency tag to the base station, which receives and decodes the information. The information read is used by the security system to determine if access is appropriate. Also, RFID devices may be written remotely by an excitation signal appropriately modulated in a predetermined manner.

In addition to typical applications for access control of persons, RFID devices are useful in applications identifying things, such as electronic animal identification, baggage tracking, parcel tracking, inventory management applications, asset identification and tracking, and other applications. These applications involve transmitting stored information from a device to an exciter/exciter system in close proximity with the device. These applications may also involve transmitting information from the exciter to the device for storage on the device.

Earlier RFID devices and systems primarily use electromagnetic coupling to remotely power the remote device and couple the remote device with an exciter system and a receiver system. The exciter generates an electromagnetic excitation signal to power up the device and the receiver receives the signal produced by the remote device.

Earlier electromagnetic coupling mechanisms include an oscillator as part of the exciter circuitry and a coil antenna on both the exciter circuitry and the remote device that includes an electronic circuit. For example, in an earlier system, excitation circuitry is connected to a coil antenna, which radiates excitation signals that are picked up by a coil antenna mounted on the device that also contains the electronic circuit. The excitation signals energize the circuit, which then provides an information-carrying signal that is transmitted to the receiver using electromagnetic or electrostatic coupling.

One problem with the use of electromagnetic coupling between a remote device and either an exciter or a receiver has been the complexity involved in the manufacture of remote devices that employ a coil antenna. The spiral layout of a typical coil antenna makes it more difficult to produce, increases cost and also the size of the remote device. Also, the coil antennas require tight tolerances for efficient performance.

Electrostatic coupling for RFID devices has been proposed to address the problems and cost associated with electromagnetic coupling. For electrostatically coupled RFID devices, the antenna coil and/or capacitor external to the electronic circuit are eliminated and replaced with cheaper electrostatic antennas.

In considering the use of RFID devices for applications identifying items, such as in inventory control, asset management, and the like, a problem arises in the control over which devices are energized or accessed at a particular time. For example, if a number of articles, each identified by a RFID device, are stored in close proximity, such as on a group of shelves in a warehouse or supermarket, then generally energizing the areas surrounding the RFID devices will result in numerous RFID devices responding. This may not be desirable. Of course, an anti-collision protocol for electronically selecting a particular tag or group of devices somewhat alleviates the problem. However, this solution adds overhead and attendant cost. These additional costs cannot be tolerated in many areas, such as product codes or electronic bar codes. Also, anti-collision protocols alone do not scale to extremely large numbers of RFID devices, that is, the anti-collision protocol becomes more complex in proportion to the number of RFID devices simultaneously read.

Therefore, a need exists for a simple, low cost solution for activating RFID devices that are in close proximity.

BRIEF DESCRIPTION OF THE DRAWINGS

A preferred embodiment of the invention is now described, by way of example only, with reference to the accompanying drawings in which.

DESCRIPTION OF THE PREFERRED EMBODIMENTS

Briefly, in accordance with the present invention, a radio frequency identification ("RFID") exciter includes a plurality of electrostatic (capacively coupled) antenna elements, the electostatic antenna elements being electrically isolated from each other. The exciter can generate voltages (power), read data, write data, or any combination thereof. The antenna elements may also be referred to by other names such as electrodes, electrode elements, coupling plates, conductive plates, or capacitive coupling plates. A matrix such connects the plurality of electostatic antenna elements selectively to a RFID exciter source. The matrix switch selectively couples an electrostatic antenna element to a potential terminal selected from a plurality of potential terminals on the exciter. One coupled, the selected antenna element is energized (i.e. supply with an electric current/voltage (e.g., excitation signal)), Typically, electrostatic RFID exciters generate large excitation voltages between the first and second potential terminals. The large excitation voltage may be generated before or after the matrix switch. Each switch is independently controllable by a control circuit. In accordance with the present invention, a first electrostatic antenna element is changed or selectively connected to a terminal of a fist potential and a second electrostatic antenna element, preferably adjacent to the first electrostatic antenna element, is connected to a terminal of a second potential such that an electric field is established between the electrostatic antenna elements. A RFID device/tag located between the first electrostatic antenna element and the second electrostatic antenna element is capacitively powered via the electric field, allowing the tag to perform its function of exchanging data with the exciter.

Preferably, the electrostatic antenna elements are disbursed among a plurality of supports for holding articles. From the teachings of the present invention, one of ordinary skill in the art can conceive of a variety of means for disbursing the electrostatic antenna elements among the plurality of supports for holding articles. Most preferably, the electrostatic antenna elements are disposed on contact paper that is adhesively attached to the supports. However, other suitable substrates can also be used, such as shelf lining, paper, plastic, rubber, wood, or the like. The matrix switch preferably comprises a transistor having conductive and insulating regions, the conductive and insulating regions preferably comprising polymers. The matrix switch is also preferably disposed on contact paper that is adhesively attached on or near the supports for the articles. The matrix switch can also be disposed on other suitable substrates, such as shelf lining, paper, plastic, rubber, wood, or the like.

Figure 1:
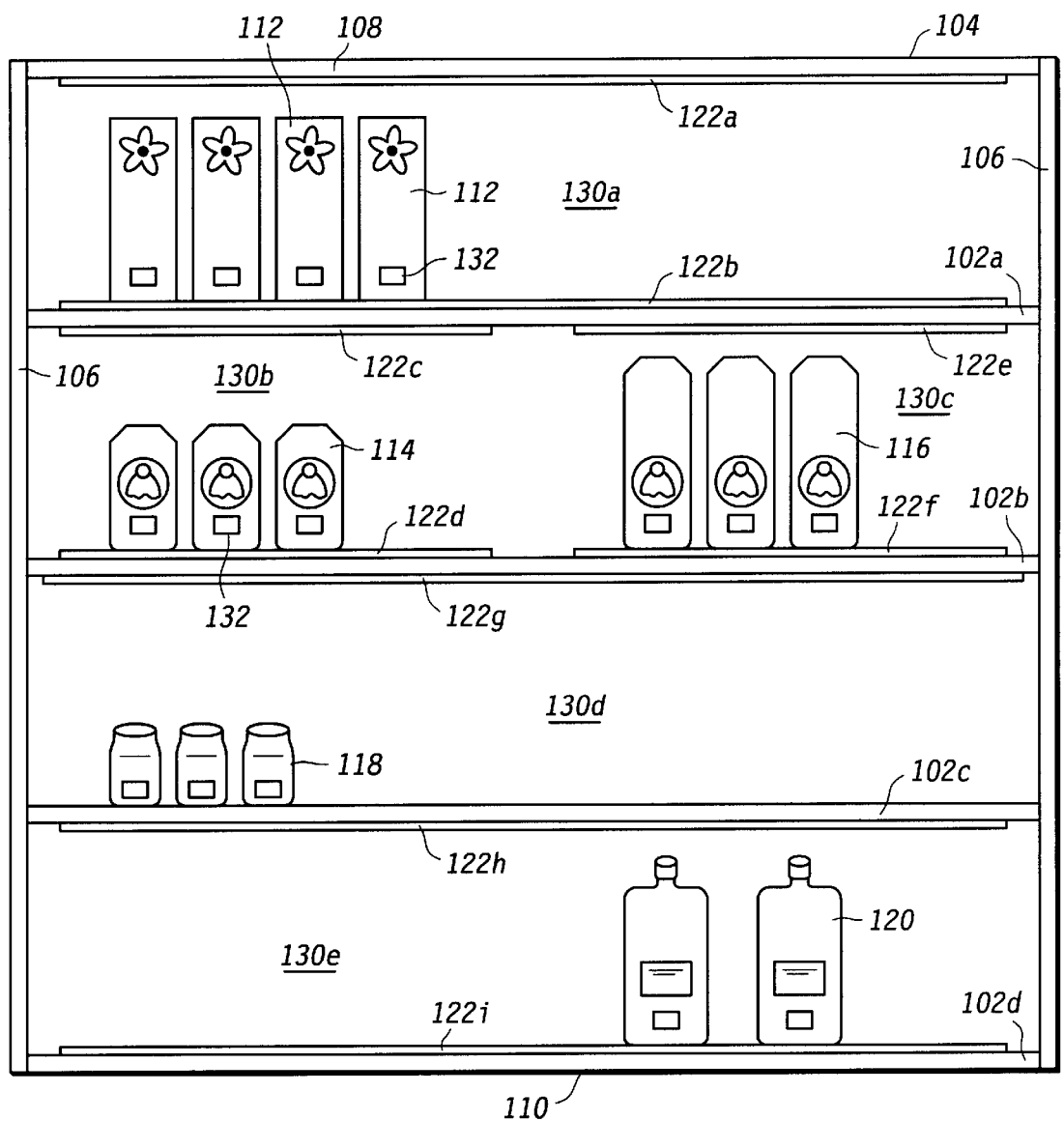
FIG. 1 is a front plan view of a group of shelves for holding products and articles, the shelves including a plurality of electrostatic antenna elements in accordance with a preferred embodiment of the present invention.

FIG. 1 is a front plan view of an arrangement of shelves for holding articles. The shelves or supports 102a–d are attached to a housing or cabinet 104 comprising sidewalls 106, top support 108 and bottom support 110. Shelves 102a–d are vertically spaced from each other. Several articles are shown supported by shelves 102. Exemplary articles 112, 114, 116, 118 and 120 are shown resting on shelves 102. The articles are food items in this example, such as cereal, jam, milk, canned goods and bottles.

A plurality of electrostatic antenna elements 122a–i are disbursed selectively onto shelves 102. Electrostatic antenna elements 122a–i are shown in FIG. 1 vertically disbursed, but are alternatively horizontally or otherwise disbursed or distributed. The electrostatic antenna elements 122 and the shelves 102 define active areas 130a, 130b, 130c, 130d and 130e. The active areas 130a–e are areas selected to have respective adjacent electrostatic antennas energized to read articles with RFID tags in the active areas 130a–e. For example, if a first electrostatic antenna element 122a and a second electrostatic antenna element 122b are energized with a potential difference, that is, one being connected to a first potential terminal of a RFID exciter circuit and the other being connected to a second potential terminal of the exciter circuit, then an electric field is generated generally around active area 130a such that articles 112, which have RFID tags 132, are excited and energized via capacitive coupling to return data to an exciter.

The other active areas, 130b, 130c, 130d and 130e have adjacent electrostatic antenna elements selectively coupled to a potential terminal of the exciter of the same potential or selectively connected to the same terminal of the exciter such that RFID devices/tags in these areas are not energized to generate a radio frequency signal that is readable by the exciter. In other words, each additional antenna elements other than the first and second antenna elements is coupled to the first potential terminal if the additional antenna element is closer to the first antenna element than the second antenna element, and is coupled to the second potential terminal if the additional antenna element is closer to the second antenna element than the first antenna element. Such a configuration is preferred in order to generate a voltage difference between a single pair of antenna elements (i.e., to generate an electric field in one active area). For example purposes only, referring to FIG. 2, assume antenna element 122c is coupled to the first potential terminal and antenna element 122d is coupled to the second potential terminal. It would be preferable to couple antenna elements 122a–b to the first potential terminal because antenna elements 122a–b are closer to antenna element 122c than to antenna element 122d. It would also be preferable to couple antenna elements 122e–i to the second potential terminal because antenna elements 122e–i are closer to antenna element 122d than to antenna element 122c. Coupling the antenna elements 122a–i in this manner prevents creating a voltage difference between any other set of antenna elements other than between antenna elements 122c–d.

Figure 2:
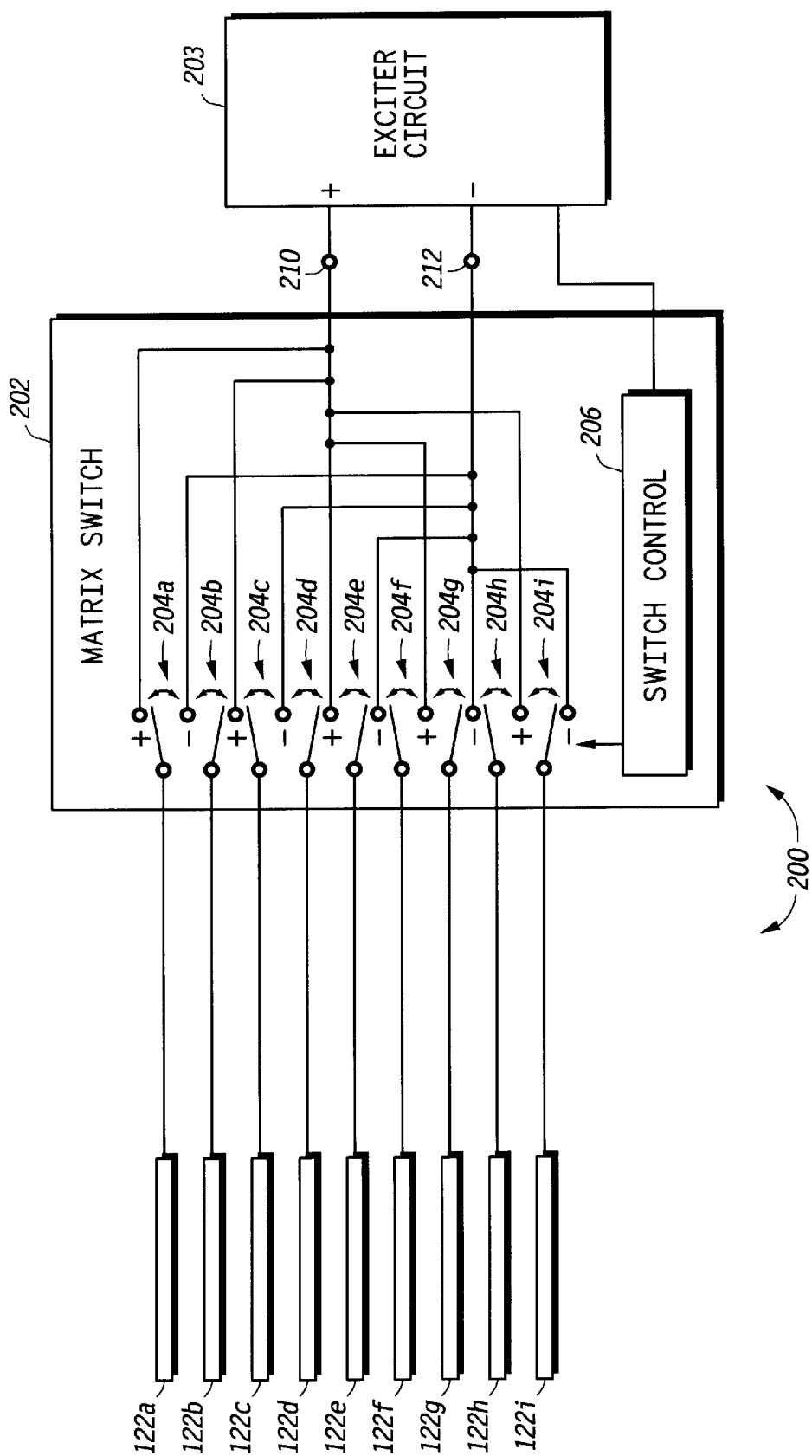
FIG. 2 is a block diagram of an electrostatic exciter for selectively activating radio frequency identification devices in accordance with the present invention.

FIG. 2 is a block diagram of an exciter 200 in accordance with the present invention. Exciter 200 includes the electrostatic antenna elements 122a–i, matrix switch 202 and exciter circuit 203. The electrostatic antenna elements 122a–i are connected to matrix switch 202 such that the electostatic antenna elements 122a–i charged to the potential of a first or second terminal of exciter circuit 203. More specifically, matrix switch 202 includes a plurality of switches 204a–i, generally with a switch corresponding to each of the electrostatic antenna elements. For example, electrostatic antenna element 122a may be connected to and controlled by switch 204a of matrix switch 202 and electrostatic antenna element 122b may be connected to and controlled by switch 204b. A switch control circuit 206 determines whether the switches 204a–i are connecting the perspective electrostatic antenna elements to the first or second potential terminal of exciter circuit 203. By virtue of switch control circuit 206, each electrostatic antenna element is independently switchable to the first or second potential terminal of exciter circuit 203, Switch control circuit 206 is shown as a part of matrix switch 202 and is coupled to exciter circuit 203. In alternate embodiments, switch control circuit 206 is located on exciter circuit 203 or another apparatus such as a computer that provides a user interface for controlling the plurality of electostatic antenna elements 122a–i. In accordance with the invention, electrostatic antenna elements 122a–i are selectively energize as determined by matrix switch 202 and exciter circuit 203 such that adjacent electrostatic antenna elements are switched in a manner to energize RFID devices/tags between the adjacent electrostatic antenna elements. For example, if electrostatic antenna element 122c is switched to the first potential terminal of exciter circuit 203 and electrostatic antenna element 122d is switched to be connected to the second potential terminal of exciter circuit 203, where there is a potential (voltage) difference between the first and second potential terminals, then the articles in the area 130b are energized via capacitive coupling to provide a signal back to the exciter.

Electrostatic antenna elements 122a–i are formed from numerous suitable conductive materials. Suitable materials for antenna elements 122 include conductive ink, wire, or a conductive metal material. More specifically, suitable materials for antenna elements 122 include copper, graphite, metalized polyester, aluminum, silver ink and carbon ink. Most preferably, electrostatic antenna elements 122 are carbon-based conductive areas on contact paper or non-adhesive paper for covering shelves and the like. Antenna elements 122 are placed on a substrate using any suitable process including printing, lamination, adhesively securing, and deposition. The shape of antenna elements 122 is not limited, but preferably, for optimal performance, antenna elements 122 consume substantially all of the available surface area on the substrate. It should be noted that separate antenna elements could also be used for a receive function.

Matrix switch 202 and switches 204a–i preferably comprise polymers as described below. Though shown schematically in FIG. 2 as physical switches, switches 204 are preferably transistors or other switching elements, such as metallic contact relays and semiconductor relays. More specifically, matrix switch 202 is preferably implemented with transistors having conducting and insulating regions, the conductive and insulating regions preferably comprising polymers. The interconnections between transistors are alternatively conductive polymers as well.

Matrix switch 202 and switches 204a–i could be comprised of elements that pass primarily alternating current signals, such as capacitors, that change from low capacitance to high capacitance, however, the plurality of switches are not limited to any particular configuration of components and are not limited to corresponding to any particular number of antenna elements.

Matrix switch 202 and switches 204 could also be placed within the exciter circuit 203 so that the matrix switch 202 and switches 204 direct low voltage signals that are later stepped up to a higher voltage with transformers, autotransformers, crystals, etc. before reaching the antennas 122a–122i. This could be advantageous if it is preferred that the switches 204 be rated for only low voltage operation to reduce the cost or size of the switches 204.

A suitable exciter circuit 203 is disclosed and described in pending U.S. Ser. No. 09/521,257 filed Mar. 8, 2000, by inventors James Quaderer et al., titled "Electrostatic and Electromagnetic Communication Systems and Combinations Thereof" and assigned to Motorola, Inc. the disclosure of which is hereby incorporated by reference, verbatim and with the same effect as though it were fully and completely set forth herein. The exciter circuit has a first potential terminal 210 and a second potential terminal 212. A potential difference is developed across the first potential terminal 210 and the second potential terminal 212 to energize the electrostatic antenna elements to excite RFID tags. The first potential terminal 210 or the second potential terminal 212 may also be ground or a DC low impedance.

An alternative method may be to matrix-switch the excitation antennas 122a–122i in groups of at least two rather than individually. The excitation antennas 122a–122i would not need to be matrix-switched at all if receive antennas are matrix-switched. It is also possible to switch both excitation antennas 122a–122i and receive antennas in a matrix combination where only one row is energized while only one column is received achieving the result that only one tag is both energized and received simultaneously therefore allowing communication with only one tag. Alternatively, the receive electrodes may be switched instead of the exciter electrodes.

Figure 3:
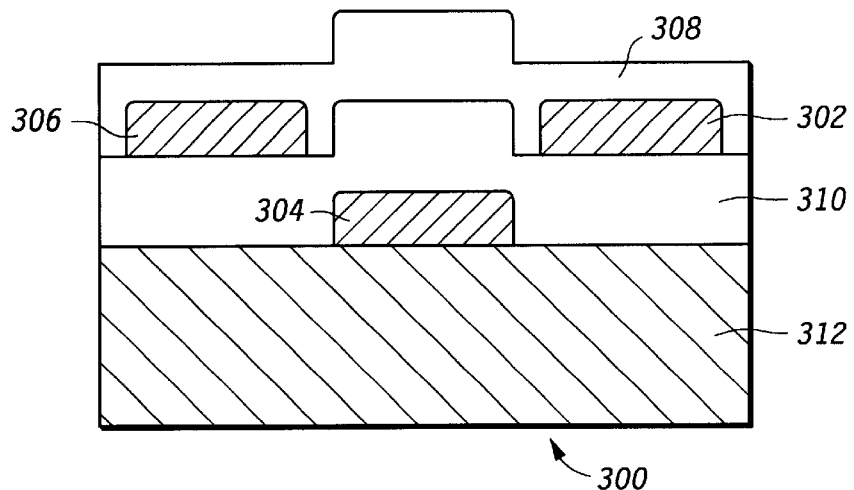
FIG. 3 is a cross-sectional view of an organic transistor for implementing components of the electrostatic exciter of FIG. 2.

FIG. 3 is a cross-sectional view showing schematically an organic transistor 300 for use with the polymer-based circuits in accordance with the present invention. Transistor 300 includes a source 302, a gate 304, and a drain 306. Source 302, gate 304 and drain 306 are conductive regions. A molecular or polymeric channel 308 connects the source and drain contacts. Channel 308 is a semiconducting region. An organic or inorganic gate insulator 310 is shown below the source 302 and drain 306. Gate insulator 310 is an insulating region. A substrate 312, which is preferably an organic or inorganic material, provides the base for the transistor components. Direct printing is the preferred method for fabricating the organic transistors. Printing is accomplished by ink jet printing, die sublimation printing, flexographic printing and the like. Polymers are preferably used for the interconnections between organic transistors.

Figure 4:
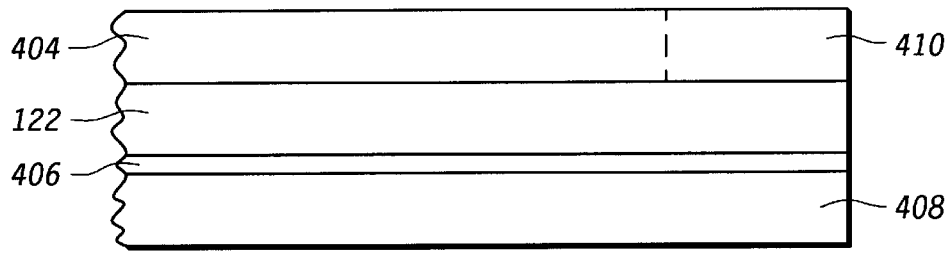
FIG. 4 is a cross sectional view of an electrostatic antenna element in accordance with the present invention.

FIG. 4 shows a preferred electrostatic antenna assembly 402 in cross section prior to application to a shelf for support. Electrostatic antenna element 122 is preferably comprised of conductive ink printed on a non-conductive substrate, such as paper or plastic. Alternatively, the antenna element 122 is comprised of a conductor, for example, a metal foil, such as a copper or aluminum foil, A protective cover 404 is preferably formed or laminated onto a first surface of the antenna element 122. Protective cover 404, as the name suggests, protects the antenna element 122 from damage, such as damage from contact with articles or things stored on the electrostatic antenna. Preferably, protective cover 404 is plastic, but can be any other suitable material. Adhesive layer 406 is formed on a second surface of the antenna element 122. A removable cover layer 408 is used to protect the adhesive layer 406 prior to application of the electrostatic antenna to a support. A removable cover point 410 is formed into the protective cover for ready removal to provide circuit connections to electrostatic antenna element 122. In particular, removable cover point 410 may be removed to attach a terminal of matrix switch 202 to an electrostatic antenna element.

Figure 5:
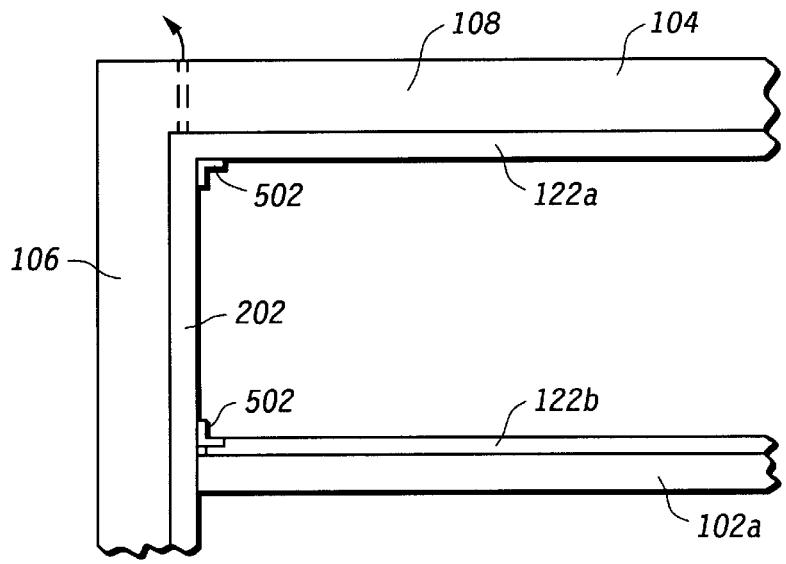
FIG. 5 is a front plan view of a shelf in a cabinet configuration showing an electrostatic antenna element connected to a matrix switch in accordance with the present invention.

FIG. 5 shows a corner portion of cabinets 104 including sidewall 106 and shelf 102A. Electrostatic antenna elements 122a and 122b are shown connected to top support 108 and shelf 102a, respectively. Matrix switch 202 is shown attached to a back wall or sidewall 106. A conductive tape 502 is shown coupling matrix switch 202 to electrostatic antenna elements 122a and 122b. Most preferably, conductive tape 502 is attached to portions of matrix switch 202 and electrostatic antenna elements 122. Preferably, areas exposed by the removal of removable cover point 410 are coupled by conductive tape 502 to the appropriate circuitry. Conductive tape 502 is any suitable conductor adhesively or otherwise secured to make a direct or capacitive connection. Preferably conductive tape 502 is a conducting tape. Alternatively, conductive tape 502 is a wire or other conductor adhesively secured in place.

Figure 6:
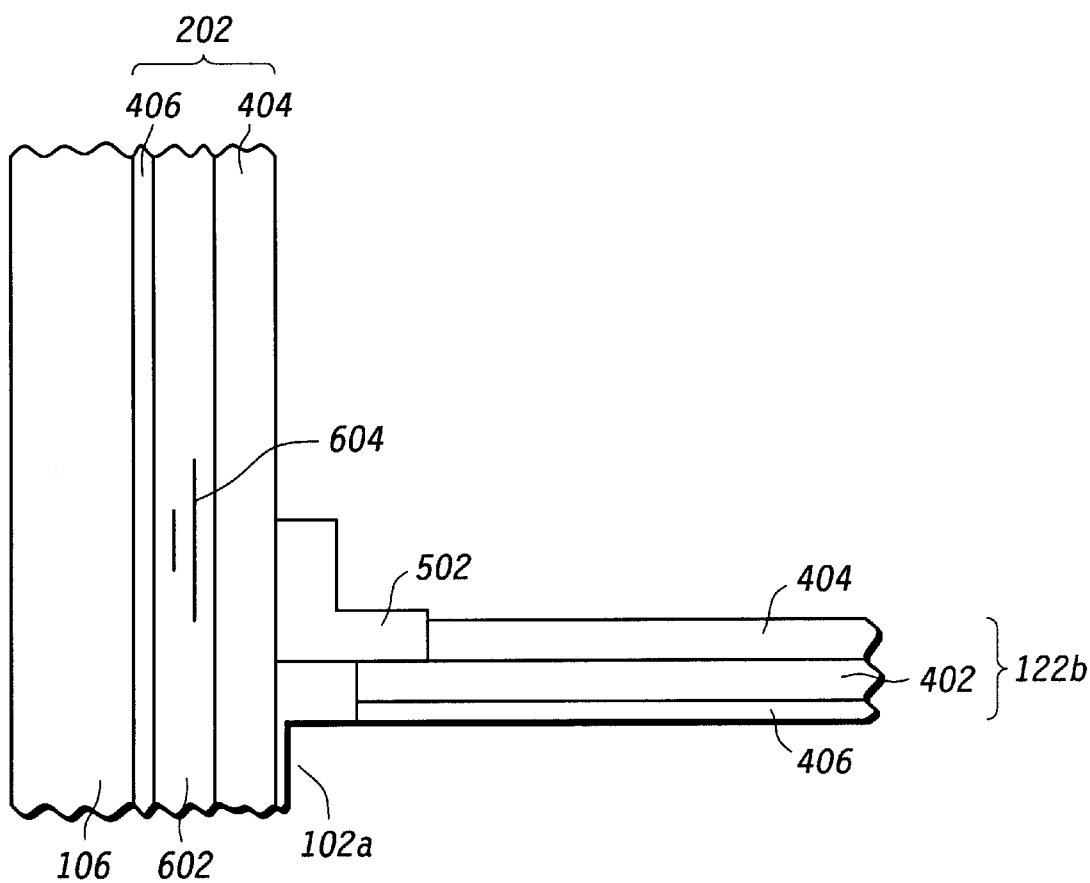
FIG. 6 is a sectional view showing schematically the connection between the electrostatic antenna element and matrix switch shown in FIG. 5.

FIG. 6 is a sectional view showing in further detail the coupling of conductive tape 502 to matrix switch 202 and electrostatic antenna element 122b. In particular, conductive tape 502 is shown directly connected to electrostatic antenna element 122b and capacitively connected to matrix switch 202. In FIG. 6, matrix switch 202 is implemented in contact paper in a manner analogous to the implementation of the electrostatic antenna element shown in FIG. 4. The matrix switch components, e.g., transistors and connections, are shown schematically, generally by reference numeral 604. These components are in layer 602, which are adjacent an adhesive layer 406 on one surface and a protective cover 404 on an opposite surface. Electrostatic antenna element 122b has a portion of conductive plate 402 exposed due to removal of a removable cover point 410. Conductive tape 502 makes a direct connection to conductive plate 402 in the exposed area. On the other hand, matrix switch 202 does not have an exposed connection point shown. Instead capacitive coupling is used to couple conductive tape 502 to switch components 604. Direct and capacitive coupling are alternatively used to couple conductive tape 502 to either matrix switch 202 or an antenna element. The coupling may be accomplished in any other suitable manner, including having conductors integral to one or both of the matrix switch or the antenna elements that make direct or capacitive connections.

In accordance with a preferred embodiment of the present invention, all the components of the exciter 200 are on one or more substrates, such as substrate 312, and are made from printable materials such as, carbon nanotubes or carbon fullerenes (e.g. C60, etc.) conjugated semiconducting polymer (e.g. polythiophene, etc.), a high-density pi-bond organic oligomer (e.g., pentacene, etc.), self assembled nanoparticles (e.g., CdSe, ZnO, etc.), a ceramic filled polymer dielectric (e.g., BaTiO, etc.), and the like. These polymer-based circuits and components of the present invention are generally more flexible and lower in cost when compared to silicon-based integrated circuits. Moreover, the polymerbased components of the present invention are ideally suited for integration into or attachment onto both flexible and rigid products, such as, for example, product packages, labels, forms, identification tags made from papers, fabrics, glass, wood, plastics, rubber, and other flexible and rigid non-conductive materials. The components and interconnections are preferably printed or selectively etched to achieve the desired functionality. Where all components of exciter 200 are not printed on the same substrate, the matrix switch 202 and the electrostatic antenna elements 122 are at least preferably printed on a substrate using the printed materials listed above.

In operation, shelves, such as grocery shelves or warehouse shelves receive electrostatic antenna elements 122. If electrostatic antenna elements 122 are on contact paper, as shown in FIG. 4, then the removable cover 408 is removed to adhesively apply the antenna elements selectively. The electrostatic antenna elements are selectively applied in areas where it is desirable to separate articles for reading into groups. Such an example arrangement is shown in FIG. 1. In the preferred embodiment where matrix switch 202 is also implemented as a contact paper with the circuits thereon comprising polymers, contact paper such as shown in FIG. 4 is used, with components preferably printed thereon.

To read a particular area, matrix switch 20 is switched such that electrostatic antenna elements that enclose or provide a partial perimeter of the area to be read are energized with signals from exciter circuit 203, where the signals have a potential difference. These adjacent electrostatic antenna elements are connected to opposite terminals of exciter circuit 203. The remaining electrostatic antenna elements are switched to terminals of exciter circuit 203 such that the areas defined by the electrostatic antenna elements are not energized. For example, electrostatic antenna elements 122c and 122d are selectively switched by switches 204c and 204e such that 122c is connected to a first potential terminal of exciter circuit 203 and 122d is connected to a second potential terminal of exciter circuit 203. When the exciter excites the terminals, area 130b is energized by the exciter circuit. This permits articles 114 to be read by an exciter device in exciter circuit 203. In particular, radio frequency identification tags 132 are energized to return a radio frequency signal that can be read by an exciter. The electrostatic antenna elements other than electostatic antenna elements 122c and 122d are placed in a state whereby areas defined by these electrostatic antenna elements are not energized. In the examples given, electrostatic antenna elements 122b, 122a, 122e and 122f are connected to the first potential terminal of exciter circuit 203 and electrostatic antenna elements 122g, 122h and 122i are connected to the second potential terminal of exciter circuit 203. This allows the articles in the area 130b to be selectively read, while adjacent articles, such as article 116 and 112, are not energized. Of course, since each electrostatic antenna element is separately controllable, multiple active areas maybe energized.

The arrangement for selectively reading RFID devices/tags disclosed herein advantageously permits low cost, control and flexibility for reading articles. A single exciter selectively switches antenna element configurations to form active areas wherein devices/tags in the active areas only are read. The present invention eliminates the need to use multiple exciters to implement the same functionality.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description, but embraces all such alterations, modifications and variations in accordance with the spirit and scope of the appended claims.

We claim:

1. An apparatus for capacitively powering radio frequency identification devices, the apparatus comprising:
    a plurality of antenna elements;
    an exciter, coupled to at least a first portion of the plurality of antenna elements, to provide an excitation signal used to selectively energize the first portion of the plurality of antenna elements; and
    a switch selectively coupled to at least one of the plurality of antenna elements and the exciter,
    wherein the exciter has a first potential terminal and a second potential terminal, and wherein at least one of the first potential terminal and the second potential terminal emits a radio frequency signal, and wherein a first antenna element of the plurality of antenna elements is coupled to the first potential terminal by the switch and a second antenna element is coupled to the second potential terminal by the switch such that a radio frequency identification tag between the first and second antenna elements is energized.

2. The apparatus of claim 1 further comprising a receiver coupled to at least a second portion of the plurality of antenna elements, and wherein the switch is selectively coupled to the receiver.

3. The apparatus of claim 1 wherein the apparatus is coupled to ground.

4. The apparatus of claim 1 wherein the plurality of antenna elements are electrostatic antenna elements.

5. The apparatus of claim 1 wherein at least one of the following elements is disposed on a substrate: the plurality of antenna elements, and the switch.

6. The apparatus of claim 5 wherein the substrate is selected from a group consisting of: contact paper, shelf lining, paper, plastic, rubber, and wood.

7. The apparatus of claim 1 wherein the switch comprises a plurality of independent switches, and wherein one independent switch of the plurality of independent switches controls at least one antenna element of the plurality of antenna elements, and wherein each of the plurality of independent switches is controllable separately by a switch control circuit.

8. The apparatus of claim 1 wherein the plurality of antenna elements are dispersed among a plurality of supports for holding articles.

9. The apparatus of claim 8 wherein the plurality of supports are shelves.

10. The apparatus of claim 1 wherein the plurality of antenna elements comprise polymers.

11. The apparatus of claim 1 wherein the switch comprises a transistor having conductive regions and insulating regions, and the conducting and insulating regions comprise polymers.

12. The apparatus of claim 11 wherein the polymers comprise at least one of:

carbon nanotubes, carbon fullerenes, conjugated semiconducting polymer, a high-density pi-bond organic oligomer, self assembled nanoparticles, and ceramic filled polymer dielectric.

13. The apparatus of claim 1 wherein each additional antenna element of the plurality of antenna elements other than the first and second antenna elements is coupled by the switch to the first potential terminal if the additional antenna element is closer to the first antenna element than the second antenna element, and wherein each additional antenna element of the plurality of antenna elements other than the first and second antenna elements is coupled to the second potential terminal if the additional antenna element is closer to the second antenna element than the first antenna element.

14. The apparatus of claim 1 wherein the first and second antenna elements are adjacent to each other.

15. The apparatus of claim 1 wherein the radio frequency identification tags between the first and second antenna elements are energized by an excitation signal to return a data signal to the exciter.

16. The apparatus of claim 1 wherein each of the plurality of antenna elements has a first surface and a second surface, and further comprising:

a protective cover formed over the first surface of each of the plurality of antenna elements; and an adhesive layer formed on the second surface of each the plurality of antenna elements.

17. The apparatus of claim 16 wherein the conductive plate comprises carbon-based ink on a non-conductive substrate.

18. The apparatus of claim 17 wherein a portion of the protective cover is removed to expose the conductive plate and reveal a connection point and the connection point is used to couple the conductive plate to the switch.

19. The apparatus of claim 18 wherein a conductive tape couples the conductive plate to the switch.

20. The apparatus of claim 1 wherein the switch comprises variable capacitors that change their capacitance to control a flow of alternating current (AC) signals.

21. The apparatus of claim 1 wherein each additional antenna element of the plurality of antenna elements other than the first and second antenna elements is coupled by the switch to at least one of the first and second potential terminals such that a radio frequency identification tag not between the first and second antenna elements is not energized.

22. A method for capacitively activating radio frequency identification devices comprising the steps of:

selectively switching a first set of antenna elements to a first potential terminal of a circuit;

selectively switching a second set of antenna elements to a second potential terminal of a circuit, wherein at least one of the first and second potential terminals emits a radio frequency signal; and establishing a potential of each antenna element such that at least two antenna elements have a potential difference.

23. The method of claim 22 further comprising the step of selectively switching a second set of antenna elements to a second switch to selectively receive data.

24. The method of claim 22 wherein the switch comprises a plurality of independent switches, and further comprising the steps of:

independently controlling at least one of the antenna elements of the plurality of antenna elements; and separately controlling each of the plurality of independent switches.

25. The method of claim 22 further comprising the step of dispersing the plurality of antenna elements among a plurality of supports for holding articles.

26. The method of claim 22 further comprising the step of remotely powering the radio frequency identification tags in the vicinity of the at least two antenna elements by an excitation signal.

27. The method of claim 26 further comprising the step of receiving a data signal from the radio frequency identification tag.

* * * * *